United States Patent
Sakae et al.

(10) Patent No.: US 11,041,666 B2
(45) Date of Patent: Jun. 22, 2021

(54) REFRIGERATION APPARATUS

(71) Applicant: DAIKIN INDUSTRIES, LTD., Osaka (JP)

(72) Inventors: Satoru Sakae, Osaka (JP); Takahito Nakayama, Osaka (JP); Takenori Mezaki, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 63 days.

(21) Appl. No.: 16/342,351

(22) PCT Filed: Oct. 17, 2017

(86) PCT No.: PCT/JP2017/037478
§ 371 (c)(1),
(2) Date: Apr. 16, 2019

(87) PCT Pub. No.: WO2018/074452
PCT Pub. Date: Apr. 26, 2018

(65) Prior Publication Data
US 2019/0242632 A1 Aug. 8, 2019

(30) Foreign Application Priority Data

Oct. 17, 2016 (JP) .............................. JP2016-203937

(51) Int. Cl.
*F25B 49/02* (2006.01)
*F25B 1/00* (2006.01)
(Continued)

(52) U.S. Cl.
CPC ................ *F25B 49/02* (2013.01); *F25B 1/00* (2013.01); *F25B 2500/222* (2013.01);
(Continued)

(58) Field of Classification Search
CPC .......... F25B 2500/222; F25B 2500/221; F25B 2600/11; F25B 2600/0251;
(Continued)

(56) References Cited

U.S. PATENT DOCUMENTS 6,701,722 B1* 3/2004 Seo .................... F25B 13/00 62/129
2018/0094844 A1* 4/2018 Suzuki ................ F25B 13/00

FOREIGN PATENT DOCUMENTS

EP 1 270 292 A2 1/2003
EP 2559959 A2 2/2013
(Continued)

OTHER PUBLICATIONS

Sekigami, Air Conditioning Apparatus, May 30, 1990, JPH02140574A, Whole Document (Year: 1990).*

(Continued)

*Primary Examiner* — Larry L Furdge
(74) *Attorney, Agent, or Firm* — Birch, Stewart, Kolasch & Birch, LLP

(57) ABSTRACT

Provided is a refrigeration apparatus that secures safety while suppressing an increase in cost. A refrigeration apparatus performs a refrigeration cycle in a refrigerant circuit including a compressor, a heat source-side heat exchanger, and a usage-side heat exchanger. The refrigeration apparatus comprises a usage-side fan providing an air flow, and a controller. The usage-side fan is disposed in a target space where inside air is cooled. The controller performs a refrigerant leak determination process to determine whether a refrigerant leak occurs, based on a state of a refrigerant in the refrigerant circuit. When the controller performs the refrigerant leak determination process to determine that a refrigerant leak occurs, then the controller performs leakage refrigerant agitation control to operate the usage-side fan so (Continued)

as to suppress local emergence of a region where the refrigerant leaks at a high concentration in the target space.

6 Claims, 3 Drawing Sheets

(51) Int. Cl.
*F25D 11/00* (2006.01)
*F25D 13/00* (2006.01)

(52) U.S. Cl.
CPC ... *F25B 2600/11* (2013.01); *F25B 2700/1933* (2013.01); *F25B 2700/21152* (2013.01); *F25D 11/00* (2013.01); *F25D 13/00* (2013.01)

(58) Field of Classification Search
CPC ........ F25B 2600/2515; F25B 2600/112; F25B 2700/21152; F25B 2700/1933; F25B 41/04; F25B 49/005
See application file for complete search history.

(56) References Cited

FOREIGN PATENT DOCUMENTS

| EP | 2618079 A1 | 7/2013 |
|---|---|---|
| GB | 2547583 A | 8/2017 |
| JP | H02140574 A * | 5/1990 |
| JP | H02247442 A * | 10/1990 |
| JP | 6-265246 A | 9/1994 |
| JP | 7-120122 A | 5/1995 |
| JP | 7-294073 A | 11/1995 |
| JP | 8-327195 A | 12/1996 |
| JP | 2005-274065 A | 10/2005 |
| JP | 2013-72579 A | 4/2013 |
| WO | WO 2016/088167 A1 | 6/2016 |
| WO | WO 2016/157615 A1 | 10/2016 |

OTHER PUBLICATIONS

Kawashima, Air Conditioner and its Failure Diagnosis Method, Oct. 3, 1990, Whole Document (Year: 1990).*
Extended European Search Report, dated May 26, 2020, for European Application No. 17862923.4.

* cited by examiner

REFRIGERATION APPARATUS

TECHNICAL FIELD

The present invention relates to a refrigeration apparatus.

BACKGROUND ART

There has been known a refrigeration apparatus that performs a refrigeration cycle in a refrigerant circuit including a compressor, a heat source-side heat exchanger, and a usage-side heat exchanger. For example, Patent Literature 1 (JP 2005-274065 A) discloses a refrigeration apparatus to be installed in a container for marine shipping. In the refrigeration apparatus, a usage-side heat exchanger disposed inside the container, a heat source-side heat exchanger disposed outside the container, and a compressor disposed outside the container are connected via connection pipes to constitute a refrigerant circuit. The refrigeration apparatus performs a vapor compression refrigeration cycle in the refrigerant circuit to cool the space in the container.

SUMMARY OF THE INVENTION

Technical Problem

A combustible refrigerant is sometimes employed for a refrigeration apparatus. From the viewpoints of improvement in energy conservation and reduction in environmental load, recently, some refrigeration apparatuses employ a slightly combustible refrigerant (i.e., a refrigerant with low combustibility, which is combustible at a concentration of a predetermined value or more) such as R32. In this regard, such a refrigeration apparatus requires measures for ensuring safety from a refrigerant leak which may occur at a refrigerant circuit due to, for example, damages to or installation failures on pipes and components.

As to a refrigeration apparatus, a usage-side heat exchanger is sometimes disposed in a highly airtight space having no ventilating opening or the like (a target space). As to the refrigeration apparatus disclosed in Patent Literature 1, for example, the space inside the container where the usage-side heat exchanger is disposed is typically a highly airtight space having no ventilating opening. If a refrigerant leak occurs at a usage-side heat exchanger or a refrigerant pipe to be disposed in such a highly airtight target space, the target space may undergo local emergence of a region where the refrigerant leaks at a high concentration exceeding a reference value.

In order to avoid such a situation, a refrigerant leak should be detected immediately; however, a refrigerant leak sensor for directly detecting the refrigerant leak results in an increase of manufacturing cost. In addition, such a refrigerant leak sensor may operate abnormally due to a malfunction and age deterioration, and therefore requires regular inspection and maintenance which are costly as to time and effort for the regular inspection and maintenance.

Hence, the present invention provides a refrigeration apparatus that secures safety while suppressing an increase in cost.

Solutions to Problem

According to a first aspect of the present invention, a refrigeration apparatus performs a refrigeration cycle in a refrigerant circuit. The refrigeration apparatus includes a fan and a controller. The refrigerant circuit includes a compressor, a heat source-side heat exchanger, and a usage-side heat exchanger. The compressor is configured to compress a refrigerant. The usage-side heat exchanger is disposed in a target space. The target space is a space to be cooled or heated. The fan is disposed in the target space. The fan is configured to provide an air flow. The controller is configured to control operations of each of actuators. The controller is also configured to make a refrigerant leak determination. The controller makes the refrigerant leak determination as to whether a refrigerant leak occurs, based on a state of the refrigerant in the refrigerant circuit. The controller is also configured to perform first control when determining from the refrigerant leak determination that a refrigerant leak occurs. The controller performs the first control to operate the fan so as to suppress local emergence of a region where the refrigerant leaks at a high concentration in the target space.

In the refrigeration apparatus according to the first aspect of the present invention, the controller makes the refrigerant leak determination to determine whether a refrigerant leak occurs, based on a state of the refrigerant in the refrigerant circuit. This configuration enables detection of a refrigerant leak without use of the refrigerant leak sensor. This results in a reduction of cost for the refrigerant leak sensor. This configuration therefore suppresses an increase in cost.

The controller performs the first control upon detection of a refrigerant leak. Upon occurrence of a refrigerant leak, therefore, the fan operates in the target space. As a result, an air flow provided by the fan agitates the leakage refrigerant in the target space, which suppresses local emergence of a combustible region where the refrigerant leaks at a high concentration. This configuration thus ensures safety.

This refrigeration apparatus hence ensures safety while suppressing an increase in cost.

Examples of the refrigerant used herein may include, but not limited to, slightly combustible refrigerants such as R32.

In addition, the state of the refrigerant used herein is not limited as long as it is a variable capable of identifying occurrence of a refrigerant leak, and examples thereof may include a pressure of a refrigerant, and a temperature of a refrigerant.

According to a second aspect of the present invention, the refrigeration apparatus according to the first aspect further includes a pressure sensor. The pressure sensor is configured to detect a pressure of the low-pressure refrigerant in the refrigerant circuit. The controller makes the refrigerant leak determination to determine that a refrigerant leak occurs, when a value detected by the pressure sensor is equal to or less than a predetermined first reference value.

The refrigerant leak determination enables a determination as to occurrence of a refrigerant leak based on a pressure of the low-pressure refrigerant in the refrigerant circuit. This results in an accurate determination as to occurrence of a refrigerant leak.

The first reference value used herein is set in accordance with a configuration of a refrigerant circuit (e.g., design specifications and installation environments of components constituting a refrigerant circuit).

According to a third aspect of the present invention, in the refrigeration apparatus according to the second aspect, the first reference value is a value equivalent to an atmospheric pressure. The value equivalent to the atmospheric pressure used herein involves not only a value of the atmospheric pressure, but also a value approximate to the atmospheric pressure. That is, the value equivalent to the atmospheric pressure includes a value approximate to the atmospheric pressure at a predetermined ratio such as a ratio from 90% or more to 110% or less of the atmospheric pressure. The controller thus determines that a refrigerant leak occurs, when the pressure of the low-pressure refrigerant in the refrigerant circuit is equal to or less than the atmospheric pressure or has a value approximate to the atmospheric pressure. This results in an accurate determination as to occurrence of a refrigerant leak.

According to a fourth aspect of the present invention, the refrigeration apparatus according to any of the first to third aspects further includes a temperature sensor. The temperature sensor is configured to detect a temperature of the refrigerant to be discharged from the compressor. The controller makes the refrigerant leak determination to determine that a refrigerant leak occurs, when a value detected by the temperature sensor is equal to or more than a predetermined second reference value. The refrigerant leak determination enables a determination as to occurrence of a refrigerant leak based on a temperature of the refrigerant to be discharged from the compressor. This results in an accurate determination as to occurrence of a refrigerant leak by the refrigerant leak determination.

The second reference value used herein is set in accordance with a configuration of a refrigerant circuit (e.g., design specifications and installation environments of components constituting a refrigerant circuit).

According to a fifth aspect of the present invention, the refrigeration apparatus according to any of the first to fourth aspects further includes an interruption valve. The interruption valve is switched to a closed state to interrupt a flow of the refrigerant from an outside of the target space into an inside of the target space. The controller is configured to perform second control when determining from the refrigerant leak determination that a refrigerant leak occurs. The controller performs the second control to bring the interruption valve into the closed state so as to perform a pump down operation to recover the refrigerant into a component disposed outside the target space. The controller stops the compressor after completion of the pump down operation subsequent to the second control.

With this configuration, upon occurrence of a refrigerant leak, the controller recovers the refrigerant in the refrigerant circuit into the component disposed outside the target space, and then stops circulation of the refrigerant. This results in suppression of further progression of a refrigerant leak that occurs at the target space. With this configuration, the controller also determines whether a refrigerant leak spot is located in the target space, based on a state, such as a pressure or a temperature, of the refrigerant circuit after completion of the pump down operation.

Examples of the component disposed outside the target space may include, but not limited to, a heat source-side heat exchanger and a receiver.

According to a sixth aspect of the present invention, in the refrigeration apparatus according to the fifth aspect, the controller makes the refrigerant leak determination to determine whether a refrigerant leak occurs at the target space. The controller performs the first control when determining from the refrigerant leak determination that a refrigerant leak occurs at the target space.

With this configuration, the controller performs the first control upon occurrence of a refrigerant leak at the target space. That is, the fan does not necessarily operate if a refrigerant leak occurs outside the target space, but operates only in case of necessity in view of safety (i.e., if a refrigerant leak occurs at the target space). This configuration thus improves energy conservation while ensuring safety.

Advantageous Effects of Invention

The refrigeration apparatus according to the first aspect of the present invention detects a refrigerant leak without use of a refrigerant leak sensor. This results in a reduction of cost for the refrigerant leak sensor. This configuration therefore suppresses an increase in cost. In addition, the fan operates in the target space upon occurrence of a refrigerant leak. As a result, an air flow provided by the fan agitates the leakage refrigerant in the target space, which suppresses local emergence of a combustible region where the refrigerant leaks at a high concentration. This configuration thus ensures safety. This refrigeration apparatus hence ensures safety while suppressing an increase in cost.

Each of the refrigeration apparatuses according to the second to fourth aspects of the present invention makes a determination as to occurrence of a refrigerant leak with good accuracy.

The refrigeration apparatus according to the fifth aspect of the present invention suppresses further progression of a refrigerant leak that occurs at the target space. In addition, this refrigeration apparatus determines whether a refrigerant leak spot is located in the target space.

The refrigeration apparatus according to the sixth aspect of the present invention improves energy conservation while ensuring safety.

DESCRIPTION OF EMBODIMENTS

A refrigeration apparatus 100 according to an embodiment of the present invention will be described below with reference to the drawings. It should be noted that the following embodiments are merely specific examples of the present invention, do not intend to limit the technical scope of the present invention, and may be appropriately modified without departing from the gist of the present invention.

(1) Refrigeration Apparatus 100

Figure 1:
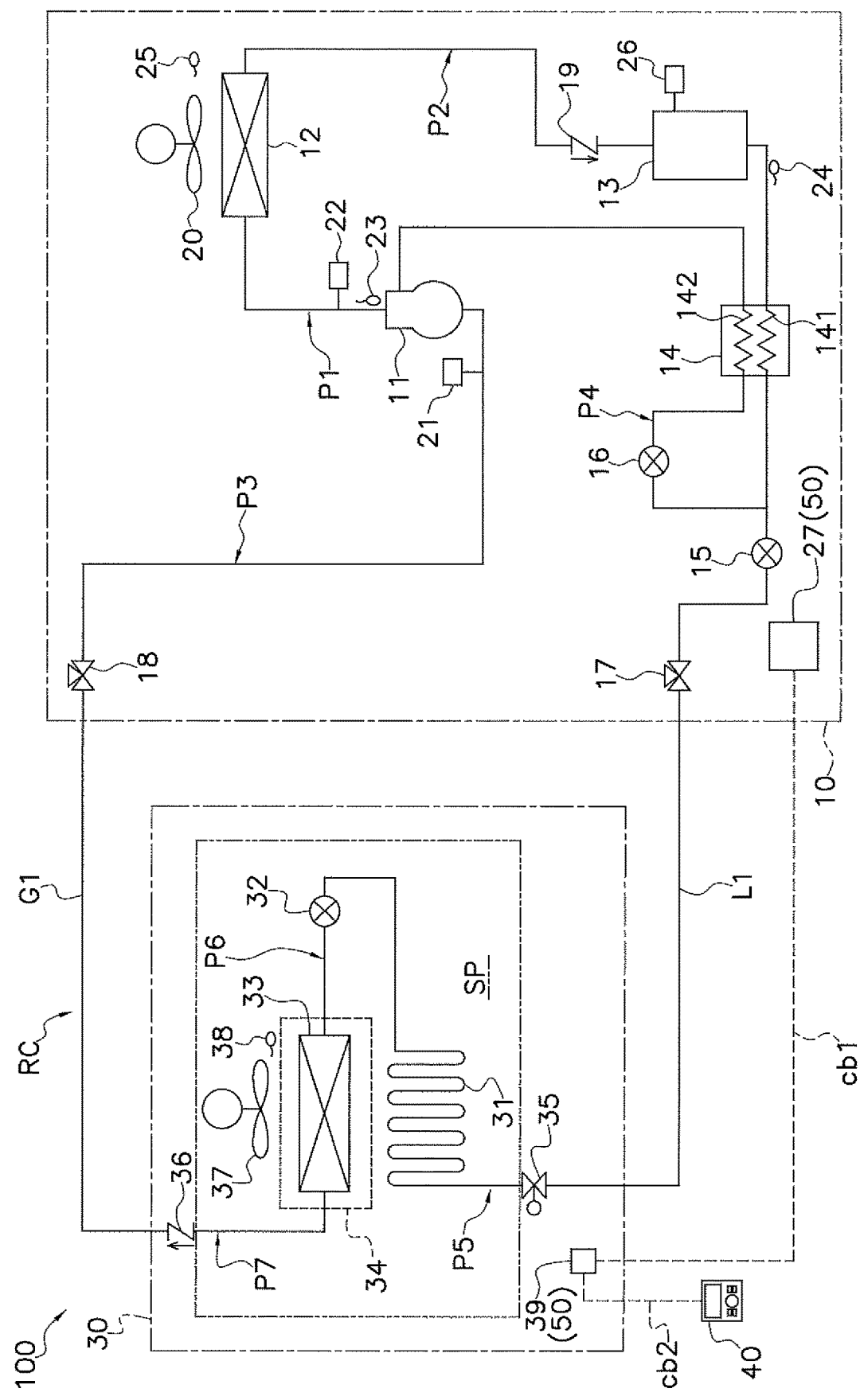
FIG. 1 is a schematic configuration diagram of a refrigeration apparatus according to an embodiment of the present invention.

FIG. 1 is a schematic configuration diagram of a refrigeration apparatus 100 according to an embodiment of the present invention. The refrigeration apparatus 100 employs a vapor compression refrigeration cycle to cool a target space SP. Examples of the target space SP may include the interior of a low-temperature warehouse, the interior of a shipping container, and the interior of a showcase in a store. The refrigeration apparatus 100 mainly includes a heat source unit 10, a usage unit 30, a plurality of remote controllers 40 each serving as an input device and a display device, and a controller 50 configured to control operation of the refrigeration apparatus 100.

In the refrigeration apparatus 100, the heat source unit 10 and the usage unit 30 are connected via a liquid-side connection pipe L1 and a gas-side connection pipe G1 to constitute a refrigerant circuit RC. The refrigeration apparatus 100 performs a refrigeration cycle to compress, cool or condense, decompress, heat or evaporate, and then compress again a refrigerant in the refrigerant circuit RC. In this embodiment, the refrigerant circuit RC is filled with slightly combustible R32 as a refrigerant for a vapor compression refrigeration cycle.

(1-1) Heat Source Unit 10

The heat source unit 10 is connected to the usage unit 30 via the liquid-side connection pipe L1 and the gas-side connection pipe G1, and constitutes a part of the refrigerant circuit RC. The heat source unit 10 includes a compressor 11, a heat source-side heat exchanger 12, a receiver 13, a subcooler 14, a heat source-side expansion valve 15, an injection valve 16, a liquid-side shutoff valve 17, a gas-side shutoff valve 18, and a check valve 19 that correspond to circuit elements constituting the refrigerant circuit RC.

The heat source unit 10 also includes a first gas-side refrigerant pipe P1, a liquid-side refrigerant pipe P2, and a second gas-side refrigerant pipe P3. The first gas-side refrigerant pipe P1 connects a discharge side of the compressor 11 to a gas-side port of the heat source-side heat exchanger 12. The liquid-side refrigerant pipe P2 connects a liquid-side port of the heat source-side heat exchanger 12 to the liquid-side shutoff valve 17. The second gas-side refrigerant pipe P3 connects a suction side of the compressor 11 to the gas-side shutoff valve 18.

The heat source unit 10 also includes an injection pipe P4 configured to shunt part of the refrigerant flowing through the liquid-side refrigerant pipe P2 back to the compressor 11. The injection pipe P4 branches off the liquid-side refrigerant pipe P2 at a portion downstream of the subcooler 14, passes through the subcooler 14, and is connected to the compressor 11 in an intermediate state of a compression process.

The compressor 11 is a device configured to change by compression a low-pressure refrigerant to a high-pressure refrigerant in the refrigeration cycle. The compressor 11 used in this embodiment is a hermetic compressor in which a displacement, such as rotary or scroll, compression element (not illustrated) is driven to rotate by a compressor motor (not illustrated). The compressor motor has an operating frequency controllable by an inverter, and controlling the operating frequency enables capacity control for the compressor 11.

The heat source-side heat exchanger 12 functions as a condenser or a radiator for the high-pressure refrigerant in the refrigeration cycle. The heat source-side heat exchanger 12 includes a plurality of heat transfer tubes and a plurality of heat transfer fins (not illustrated). The heat source-side heat exchanger 12 is configured to cause the refrigerant in each of the heat transfer tubes to exchange heat with air passing around the heat transfer tubes or heat transfer fins.

The receiver 13 temporarily stores therein the refrigerant condensed in the heat source-side heat exchanger 12. The receiver 13 is disposed on the liquid-side refrigerant pipe P2.

The subcooler 14 is a heat exchanger for further cooling the refrigerant temporarily stored in the receiver 13. The subcooler 14 is disposed on the liquid-side refrigerant pipe P2 at a position downstream of the receiver 13. The subcooler 14 includes: a first flow path 141 through which the refrigerant flowing through the liquid-side refrigerant pipe P2 passes; and a second flow path 142 through which the refrigerant flowing through the injection pipe P4 passes. The subcooler 14 causes the refrigerant flowing through the first flow path 141 to exchange heat with the refrigerant flowing through the second flow path 142.

The heat source-side expansion valve 15 is an electric expansion valve whose opening degree is controllable. The heat source-side expansion valve 15 is disposed on the liquid-side refrigerant pipe P2 at a position downstream of the subcooler 14.

The injection valve 16 is disposed on the injection pipe P4 at a position leading to an inlet of the subcooler 14. The injection valve 16 is an electric expansion valve whose opening degree is controllable. The injection valve 16 decompresses, in accordance with its opening degree, the refrigerant flowing through the injection pipe P4 at a position upstream of the inlet and outlet of the subcooler 14 (i.e., the second flow path 142). As described above, the subcooler 14 is configured to cool the refrigerant temporarily stored in the receiver 13, with the refrigerant branched from the liquid-side refrigerant pipe P2 via the injection pipe P4.

The liquid-side shutoff valve 17 is a manual valve disposed at a joint between the liquid-side refrigerant pipe P2 and the liquid-side connection pipe L1. The liquid-side shutoff valve 17 has a one end connected to the liquid-side refrigerant pipe P2, and the other end connected to the liquid-side connection pipe L1.

The gas-side shutoff valve 18 is a manual valve disposed at a joint between the second gas-side refrigerant pipe P3 and the gas-side connection pipe G1. The gas-side shutoff valve 18 has a one end connected to the second gas-side refrigerant pipe P3, and the other end connected to the gas-side connection pipe G1.

The check valve 19 is disposed on the liquid-side refrigerant pipe P2. Specifically, the check valve 19 is disposed between an outlet of the heat source-side heat exchanger 12 and an inlet of the receiver 13. The check valve 19 permits a flow of the refrigerant from the outlet of the heat source-side heat exchanger 12, but interrupts a flow of the refrigerant from the inlet of the receiver 13.

The heat source unit 10 also includes a heat source-side fan 20 for sucking air outside the target space SP (outside air), causing the outside air to exchange heat with the refrigerant in the heat source-side heat exchanger 12, and then discharging the outside air. The heat source-side fan 20 provides an air flow passing through the heat source-side heat exchanger 12 at the outside of the target space SP. In other words, the heat source-side fan 20 is configured to supply to the heat source-side heat exchanger 12 the outside air for cooling the refrigerant flowing through the heat source-side heat exchanger 12. The heat source-side fan 20 includes a heat source-side fan motor (not illustrated) for driving the heat source-side fan 20.

The heat source unit 10 also includes a plurality of pressure sensors. In the heat source unit 10, specifically, a suction pressure sensor 21 and a discharge pressure sensor 22 are disposed around the compressor 11. The suction pressure sensor 21 is configured to detect a suction pressure LP that is a pressure of the refrigerant at the suction side of the compressor 11. The discharge pressure sensor 22 is configured to detect a discharge pressure HP that is a pressure of the refrigerant at the discharge side of the compressor 11. The suction pressure sensor 21 is connected to the second gas-side refrigerant pipe P3 functioning as a suction pipe for the compressor 11. The discharge pressure sensor 22 is connected to the first gas-side refrigerant pipe P1 functioning as a discharge pipe for the compressor 11.

The heat source unit 10 also includes a plurality of temperature sensors such as a thermistor and a thermocouple. Specifically, the heat source unit 10 includes a discharge temperature sensor 23 disposed on the discharge pipe (i.e., the first gas-side refrigerant pipe P1) for the compressor 11. The discharge temperature sensor 23 is configured to detect a discharge temperature HT that is a temperature of the refrigerant discharged from the compressor 11. The heat source unit 10 also includes a receiver outlet temperature sensor 24 disposed between an outlet of the receiver 13 and the inlet of the subcooler 14 (i.e., the first flow path 141) on the liquid-side refrigerant pipe P2. The receiver outlet temperature sensor 24 is configured to detect a receiver outlet temperature LT that is a temperature of the refrigerant at the outlet of the receiver 13. The heat source unit 10 also includes an outside temperature sensor 25 disposed around the heat source-side heat exchanger 12 or the heat source-side fan 20. The outside temperature sensor 25 is configured to detect an outside temperature OT of an air flow to be sucked into the heat source unit 10.

The heat source unit 10 also includes a liquid level sensor 26 disposed on the receiver 13. The liquid level sensor 26 is configured to detect a liquid level height HL of the liquid refrigerant in the receiver 13.

The heat source unit 10 also includes a heat source unit control unit 27 configured to control operations and states of each of the actuators and components in the heat source unit 10. The heat source unit control unit 27 includes a microcomputer including, for example, a central processing unit (CPU) and a memory. The heat source unit control unit 27 is electrically connected to each of the actuators (11, 15, 16, 20) and the various sensors (21 to 26) in the heat source unit 10 to exchange signals with these actuators and sensors. The heat source unit control unit 27 is connected to a usage unit control unit 39 (to be described later) of the usage unit 30 via a communication line cb1 to exchange, for example, a control signal with the usage unit control unit 39.

(1-2) Usage Unit 30

The usage unit 30 is connected to the heat source unit 10 via the liquid-side connection pipe L1 and the gas-side connection pipe G1, and constitutes a part of the refrigerant circuit RC.

The usage unit 30 includes a heating pipe 31, a usage-side expansion valve 32, a usage-side heat exchanger 33, a drain pan 34, an on-off valve 35 (an interruption valve), and a check valve 36. The usage unit 30 also includes a first liquid-side refrigerant pipe P5, a second liquid-side refrigerant pipe P6, and a gas-side refrigerant pipe P7. The first liquid-side refrigerant pipe P5 connects the liquid-side connection pipe L1 to the usage-side expansion valve 32. The second liquid-side refrigerant pipe P6 connects the liquid-side port of the usage-side heat exchanger 33 to the usage-side expansion valve 32. The gas-side refrigerant pipe P7 connects the gas-side port of the usage-side heat exchanger 33 to the gas-side connection pipe G1.

The heating pipe 31 is a refrigerant pipe through which the high-pressure liquid refrigerant from the heat source unit 10 passes. The heating pipe 31 is thermally connected to the drain pan 34 to melt a block ice being frozen drain water in the drain pan 34. The heating pipe 31 is included in the first liquid-side refrigerant pipe P5.

The usage-side expansion valve 32 is a restrictor functioning as means for decompressing (expanding) the high-pressure refrigerant to be supplied from the heat source unit 10. The usage-side expansion valve 32 is an opening degree-adjustable electric valve whose opening degree changes by application of a predetermined drive voltage. The usage-side expansion valve 32 has a one end connected to the first liquid-side refrigerant pipe P5, and a the other end connected to the second liquid-side refrigerant pipe P6. The usage-side expansion valve 32 interrupts a flow of the refrigerant between the first liquid-side refrigerant pipe P5 and the second liquid-side refrigerant pipe P6 when the opening degree thereof is set at a minimum level, that is, when the usage-side expansion valve 32 is brought into a closed state.

The usage-side heat exchanger 33 functions as an evaporator for the low-pressure refrigerant in the refrigeration cycle. The usage-side heat exchanger 33 is disposed in the target space SP and is configured to cool inside air in the target space SP. The usage-side heat exchanger 33 includes a plurality of heat transfer tubes and a plurality of heat transfer fins (not illustrated). The usage-side heat exchanger 33 is configured to cause the refrigerant in each of the heat transfer tubes to exchange heat with air passing around the heat transfer tubes or heat transfer fins.

The drain pan 34 receives and recovers the drain water generated in the usage-side heat exchanger 33. The drain pan 34 is disposed below the usage-side heat exchanger 33.

The on-off valve 35 (the interruption valve) is switched between an open state in which the on-off valve 35 permits a flow of the refrigerant and a closed state in which the on-off valve 35 interrupts a flow of the refrigerant. In this embodiment, the on-off valve 35 is an electromagnetic valve whose open state and closed state are switchable by energization. The on-off valve 35 is disposed near a liquid-side refrigerant port of the usage unit 30. That is, the on-off valve 35 is disposed closer to the liquid-side connection pipe L1 than the usage-side heat exchanger 33 and the usage-side expansion valve 32 are. More specifically, the on-off valve 35 is disposed on a refrigerant flow path in the usage unit 30 at a boundary between the inside of the target space SP and the outside of the target space SP. The on-off valve 35 in the closed state interrupts a flow of the refrigerant from the outside to the inside of the target space SR The on-off valve 35 is normally in the open state.

The check valve 36 has a first end connected to the refrigerant pipe and a second end connected the refrigerant pipe. The check valve 36 permits a flow of the refrigerant from the first end toward the second end, and interrupts a flow of the refrigerant from the second end toward the first end. The check valve 36 is disposed on a gas refrigerant port of the usage unit 30. Specifically, the check valve 36 is disposed closer to the gas-side connection pipe G1 than the usage-side heat exchanger 33 is. The check valve 36 permits a flow of the refrigerant from the gas-side refrigerant pipe P7 toward the gas-side connection pipe G1. On the other hand, the check valve 36 interrupts a flow of the refrigerant from the gas-side connection pipe G1 toward the gas-side refrigerant pipe P7.

The usage unit 30 also includes a usage-side fan 37 (a fan) for sucking air inside the target space SP (inside air), allowing the inside air to pass through the usage-side heat exchanger 33, causing the inside air to exchange heat with the refrigerant in the usage-side heat exchanger 33, and then supplying the inside air to the target space SP again. The usage-side fan 37 is disposed in the target space SP. The usage-side fan 37 includes a usage-side fan motor (not illustrated) for driving the usage-side fan 37. The usage-side fan 37 when being driven provides an air flow for heating the refrigerant flowing through the usage-side heat exchanger 33.

The usage unit 30 also includes a plurality of temperature sensors such as a thermistor and a thermocouple. Specifically, the usage unit 30 includes an inside temperature sensor 38 disposed around the usage-side heat exchanger 33 or the usage-side fan 37. The inside temperature sensor 38 is configured to detect an inside temperature IT that is a temperature of inside air sucked into the usage-side fan 37.

The usage unit 30 also includes the usage unit control unit 39 configured to control operations and states of each of the actuators and components in the usage unit 30. The usage unit control unit 39 includes a microcomputer including, for example, a CPU and a memory. The usage unit control unit 39 is electrically connected to each of the actuators (32, 35, 37) and the various sensors (38) in the usage unit 30 to exchange signals with these actuators and sensors. The usage unit control unit 39 is connected to the heat source unit control unit 27 via the communication line cb1 to exchange, for example, a control signal with the heat source unit control unit 27.

(1-3) Remote Controller 40

The remote controller 40 is an input device that causes a user to input various commands for switching an operating state of the refrigeration apparatus 100. For example, the remote controller 40 allows the user to input a command to start or stop the refrigeration apparatus 100, a command to change a set temperature, and other commands.

The remote controller 40 also functions as a display device for displaying various kinds of information for the user. For example, the remote controller 40 displays thereon an operating state, such as a set temperature, of the refrigeration apparatus 100. In addition, when a refrigerant leak occurs, the remote controller 40 displays thereon a fact that the refrigerant leak occurs, and information for notifying an administrator of necessary measures against the refrigerant leak (hereinafter, referred to as "refrigerant leak notification information").

The remote controller 40 is connected to the usage unit control unit 39 via a communication line cb2 to exchange signals with the usage unit control unit 39. The remote controller 40 transmits a command input by the user to the usage unit control unit 39 via the communication line cb2. The remote controller 40 receives an instruction via the communication line cb2 to display thereon information according to the instruction.

(1-4) Controller 50

The controller 50 is a computer configured to control operation of the refrigeration apparatus 100. In this embodiment, the heat source unit control unit 27 and the usage unit control unit 39 are connected via the communication line cb1 to constitute the controller 50. The details of the controller 50 will be described later in "(3) Details of Controller 50".

(2) Flow of Refrigerant in Refrigerant Circuit RC in Cooling Operation

Next, a description will be given of the flow of the refrigerant in the refrigerant circuit RC in each operating mode. During the operation, the refrigeration apparatus 100 performs the cooling operation (a refrigeration cycle operation) causing the refrigerant in the refrigerant circuit RC to mainly circulate through the compressor 11, the heat source-side heat exchanger 12, the receiver 13, the subcooler 14, the heat source-side expansion valve 15, the usage-side expansion valve 32, and the usage-side heat exchanger 33 in this order. In the cooling operation, the refrigerant flowing through the liquid-side refrigerant pipe P2 via the injection pipe P4 is partially shunted to return to the compressor 11 via the injection valve 16 and the subcooler 14 (i.e., the second flow path 142).

When the cooling operation is started, the refrigerant is sucked into and compressed by the compressor 11, and then is discharged from the compressor 11, in the refrigerant circuit RC. In the cooling operation, the low pressure in the refrigeration cycle corresponds to the suction pressure LP to be detected by the suction pressure sensor 21, and the high pressure in the refrigeration cycle corresponds to the discharge pressure HP to be detected by the discharge pressure sensor 22.

The compressor 11 is subjected to capacity control according to the cooling load to be required for the usage unit 30. Specifically, the operating frequency of the compressor 11 is controlled such that the suction pressure LP takes a target value set in accordance with the cooling load to be required for the usage unit 30. The gas refrigerant discharged from the compressor 11 flows into the heat source-side heat exchanger 12 through the gas-side port of the heat source-side heat exchanger 12, via the first gas-side refrigerant pipe P1.

When the gas refrigerant flows into the heat source-side heat exchanger 12 through the gas-side port of the heat source-side heat exchanger 12, the heat source-side heat exchanger 12 causes the gas refrigerant to exchange heat with the outside air supplied by the heat source-side fan 20, thereby radiating heat, and then condenses the gas refrigerant. The refrigerant flows out of the heat source-side heat exchanger 12 through the liquid-side port of the heat source-side heat exchanger 12.

When the refrigerant flows out of the heat source-side heat exchanger 12 through the liquid-side port of the heat source-side heat exchanger 12, then the refrigerant flows into the receiver 13 through the inlet of the receiver 13 via a portion, extending from the heat source-side heat exchanger 12 to the receiver 13, of the liquid-side refrigerant pipe P2. When the refrigerant flows into the receiver 13, the receiver 13 temporarily stores therein the liquid refrigerant in a saturated state. Thereafter, the refrigerant flows out of the receiver 13 through the outlet of the receiver 13. The temperature of the refrigerant at the outlet of the receiver 13 corresponds to the receiver outlet temperature LT to be detected by the receiver outlet temperature sensor 24.

When the liquid refrigerant flows out of the receiver 13 through the outlet of the receiver 13, then the liquid refrigerant flows into the subcooler 14 (i.e., the first flow path 141) through the inlet of the subcooler 14 via a portion, extending from the receiver 13 to the subcooler 14, of the liquid-side refrigerant pipe P2.

When the liquid refrigerant flows into the first flow path 141 of the subcooler 14, the subcooler 14 causes the liquid refrigerant to exchange heat with the refrigerant flowing through the second flow path 142, and further cools the liquid refrigerant, thereby bringing the liquid refrigerant into a subcooled state. The resultant liquid refrigerant flows out of the subcooler 14 through the outlet of the first flow path 141.

When the liquid refrigerant flows out of the subcooler 14 through the outlet of the first flow path 141, then the liquid refrigerant flows into the heat source-side expansion valve 15 via a portion, between the subcooler 14 and the heat source-side expansion valve 15, of the liquid-side refrigerant pipe P2. At this time, the liquid refrigerant, which has flown out of the subcooler 14 through the outlet, coupled to the liquid-side refrigerant pipe P2, of the subcooler 14, is partly shunted to the injection pipe P4 from the portion, between the subcooler 14 and the heat source-side expansion valve 15, of the liquid-side refrigerant pipe P2.

The refrigerant flowing through the injection pipe P4 is decompressed to have an intermediate pressure in the refrigeration cycle by the injection valve 16. The refrigerant decompressed by the injection valve 16 flows through the injection pipe P4, and then flows into the subcooler 14 through the inlet of the second flow path 142. When the refrigerant flows into the subcooler 14 through the inlet of the second flow path 142, the subcooler 14 causes the refrigerant to exchange heat with the refrigerant flowing through the first flow path 141, and then heats the refrigerant to turn the refrigerant into the gas refrigerant. The refrigerant heated by the subcooler 14 flows out of the subcooler 14 through the outlet of the second flow path 142, and then returns to the compressor 11 in the intermediate state of the compression process.

When the liquid refrigerant flows into the heat source-side expansion valve 15 via the liquid-side refrigerant pipe P2, then the liquid refrigerant is decompressed or the flow rate of the liquid refrigerant is adjusted in accordance with the opening degree of the heat source-side expansion valve 15. Thereafter, the resultant liquid refrigerant reaches the usage unit 30 via the liquid-side shutoff valve 17 and the liquid-side connection pipe L1.

When the refrigerant reaches the usage unit 30, then the refrigerant flows into the target space SP via the on-off valve 35. Thereafter, the refrigerant flows through the first liquid-side refrigerant pipe P5 (i.e., the heating pipe 31), and then flows into the usage-side expansion valve 32. When the refrigerant flows into the usage-side expansion valve 32, then the refrigerant is decompressed to have the low pressure in the refrigeration cycle in accordance with the opening degree of the usage-side expansion valve 32. Thereafter, the refrigerant flows into the usage-side heat exchanger 33 through the liquid-side port of the usage-side heat exchanger 33 via the second liquid-side refrigerant pipe P6.

When the refrigerant flows into the usage-side heat exchanger 33 through the liquid-side port of the usage-side heat exchanger 33, the usage-side heat exchanger 33 causes the refrigerant to exchange heat with the inside air supplied by the usage-side fan 37, and evaporates the refrigerant to turn the refrigerant into the gas refrigerant. The resultant gas refrigerant flows out of the usage-side heat exchanger 33 through the gas-side port of the usage-side heat exchanger 33. When the gas refrigerant flows out of the usage-side heat exchanger 33 through the gas-side port of the usage-side heat exchanger 33, then the gas refrigerant flows out of the target space SP and the usage unit 30 via the gas-side refrigerant pipe P7 and the check valve 36.

When the refrigerant flows out of the usage unit 30, then the refrigerant flows into the heat source unit 10 via the gas-side connection pipe G1 and the gas-side shutoff valve 18. When the refrigerant flows into the heat source unit 10, then the refrigerant flows through the second gas-side refrigerant pipe P3. Thereafter, the refrigerant is sucked into the compressor 11 again.

(3) Details of Controller 50

Figure 2:
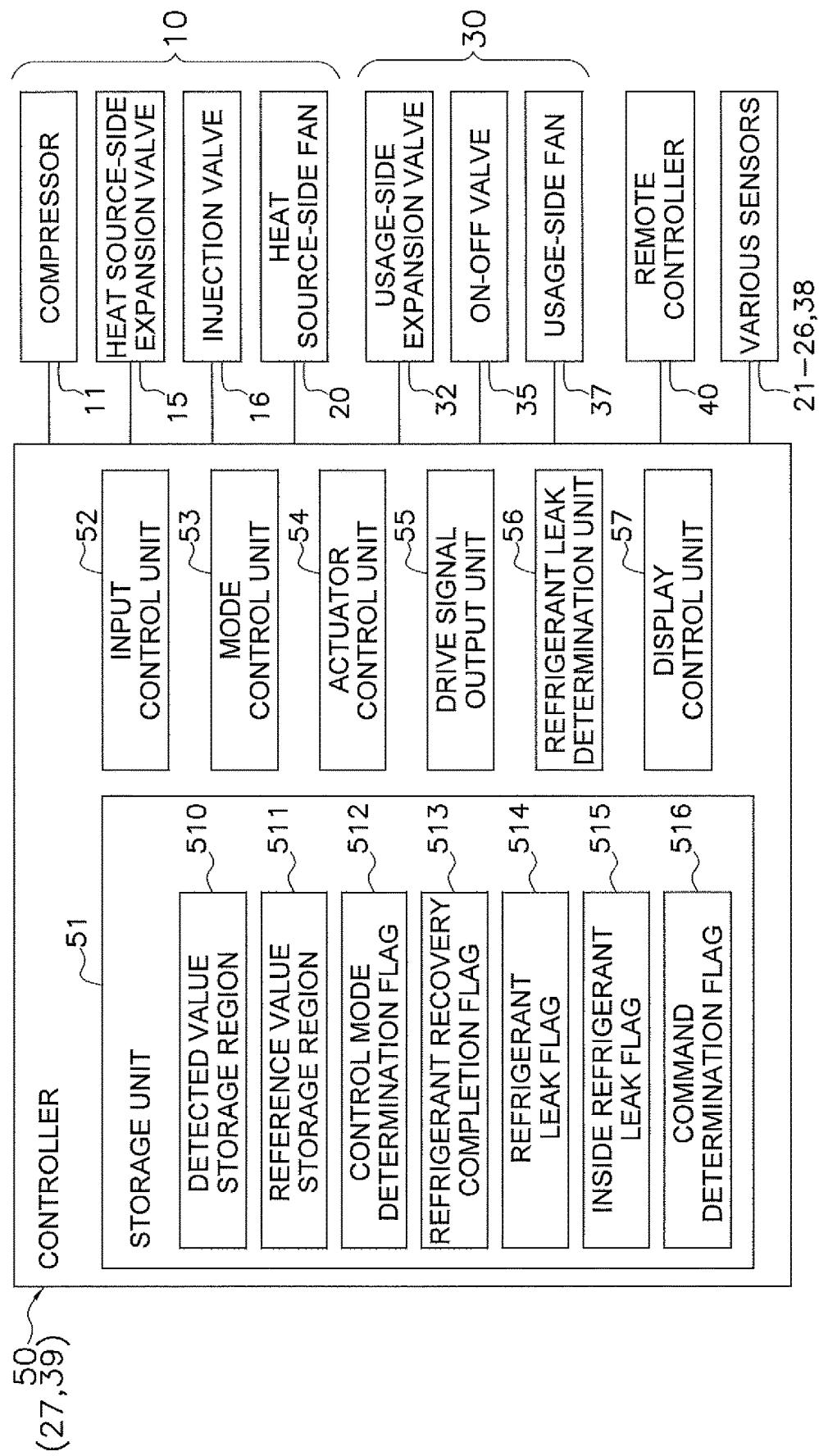
FIG. 2 is a schematic block diagram of a controller and components connected to the controller.

In the refrigeration apparatus 100, the heat source unit control unit 27 and the usage unit control unit 39 are connected via the communication line cb1 to constitute the controller 50. FIG. 2 is a schematic block diagram of the controller 50 and the components connected to the controller 50.

The controller 50 has a plurality of control modes, and controls the operation of each actuator in accordance with a control mode in which the controller 50 is to be placed. In this embodiment, examples of the control modes of the controller 50 include: a normal operating mode in which the controller 50 is placed during operation (no refrigerant leak occurs); and a refrigerant leak mode in which the controller 50 is placed upon occurrence of a refrigerant leak.

The controller 50 is electrically connected to each of the actuators (i.e., the compressor 11, the heat source-side expansion valve 15, the injection valve 16, and the heat source-side fan 20) in the heat source unit 10. The controller 50 is also electrically connected to each of the actuators (i.e., the usage-side expansion valve 32, the on-off valve 35, and the usage-side fan 37) in the usage unit 30. The controller 50 is also electrically connected to the various sensors (i.e., the suction pressure sensor 21, the discharge pressure sensor 22, the discharge temperature sensor 23, the receiver outlet temperature sensor 24, the outside temperature sensor 25, the liquid level sensor 26, the inside temperature sensor 38, and the like) in the refrigeration apparatus 100. The controller 50 is also electrically connected to the remote controller 40.

The controller 50 mainly includes a storage unit 51, an input control unit 52, a mode control unit 53, an actuator control unit 54, a drive signal output unit 55, a refrigerant leak determination unit 56, and a display control unit 57. These functional units in the controller 50 are implemented in such a manner that the CPUs, the memories, and the various electric and electronic components in the heat source unit control unit 27 and/or the usage unit control unit 39 integrally function.

(3-1) Storage Unit 51

The storage unit 51 includes, for example, a read only memory (ROM), a random access memory (RAM), and a flash memory. The storage unit 51 has a volatile storage region and a nonvolatile storage region. The storage unit 51 stores therein a control program that defines processing to be performed by each unit of the controller 50.

The storage unit 51 has a detected value storage region 510 in which values detected by the respective sensors are stored. The detected value storage region 510 stores therein, for example, a value (i.e., the suction pressure LP) detected by the suction pressure sensor 21, a value (i.e., the discharge pressure HP) detected by the discharge pressure sensor 22, a value (i.e., the discharge temperature HT) detected by the discharge temperature sensor 23, a value (i.e., the receiver outlet temperature LT) detected by the receiver outlet temperature sensor 24, a value (i.e., the outside temperature OT) detected by the outside temperature sensor 25, a value (i.e., the liquid level height HL) detected by the liquid level sensor 26, and a value (i.e., the inside temperature IT) detected by the inside temperature sensor 38.

The storage unit 51 also has a reference value storage region 511 in which a reference value table (not illustrated) is stored. The reference value table defines a first reference value SV1, a second reference value SV2, and a third reference value SV3 for use in a refrigerant leak determination to be described later.

In addition, the storage unit 51 is provided with a plurality of flags.

For example, the storage unit 51 is provided with a control mode determination flag 512 capable of determining a control mode in which the controller 50 is placed. The control mode determination flag 512 includes bits in a predetermined number, and the bits are set by a predetermined number in accordance with a control mode in which the controller 50 is placed.

The storage unit 51 is also provided with a refrigerant recovery completion flag 513 for determining whether a pump down operation (to be described later) to be executed in the refrigerant leak mode is completed. The refrigerant recovery completion flag 513 is set when the pump down operation executed in the refrigerant leak mode is completed.

The storage unit 51 is also provided with a refrigerant leak flag 514 for determining whether a refrigerant leak occurs at the refrigerant circuit RC. The refrigerant leak flag 514 is set when the refrigerant circuit RC is short of the refrigerant, that is, when the amount of refrigerant in filling the refrigerant circuit RC with the refrigerant is inappropriate or when a refrigerant leak occurs at the refrigerant circuit RC.

The storage unit 51 is also provided with an inside refrigerant leak flag 515 for determining whether a refrigerant leak occurs at the target space SP. The inside refrigerant leak flag 515 includes bits in a predetermined number, and the bits are set by a predetermined number when it is determined that a refrigerant leak occurs at the target space SP.

The storage unit 51 is also provided with a command determination flag 516 for determining whether the controller 50 receives a predetermined command (to be described later) from the remote controller 40. The command determination flag 516 includes bits in a predetermined number. When the controller 50 receives a predetermined command according to a situation, the corresponding bits are set.

(3-2) Input Control Unit 52

The input control unit 52 is a functional unit that plays a role as an interface for receiving signals from the respective components connected to the controller 50. For example, the input control unit 52 receives signals from the various sensors (21 to 26) and remote controller 40, and then stores the signals in the corresponding storage regions in the storage unit 51 or sets a predetermined flag.

(3-3) Mode Control Unit 53

The mode control unit 53 is a functional unit that switches a control mode. In a normal situation, the mode control unit 53 switches the control mode to the normal operating mode. When the refrigerant leak flag 514 is set, the mode control unit 53 switches the control mode to the refrigerant leak mode. The mode control unit 53 sets the control mode determination flag 512 in accordance with a control mode in which the controller 50 is placed.

(3-4) Actuator Control Unit 54

The actuator control unit 54 controls, based on the control program, the operations of each of the respective actuators (e.g., the compressor 11, the heat source-side expansion valve 15, the injection valve 16, and the usage-side expansion valve 32) in the refrigeration apparatus 100, in accordance with a situation. The actuator control unit 54 refers to the control mode determination flag 512, thereby determining a control mode in which the controller 50 is placed, and controls the operations of each of the respective actuators, based on the determined control mode.

In the normal operating mode, for example, the actuator control unit 54 controls the operating capacity of the compressor 11, the number of rotations of the heat source-side fan 20, the number of rotations of the usage-side fan 37, and the opening degrees of the heat source-side expansion valve 15, injection valve 16, and usage-side expansion valve 32 in real time, such that the cooling operation is performed in accordance with, for example, set temperatures and values detected by the various sensors.

The actuator control unit 54 performs refrigerant recovery control (corresponding to "second control" in the appended claims) when a refrigerant leak occurs, specifically, when the refrigerant leak flag 514 is set. The actuator control unit 54 performs the refrigerant recovery control to control the operations of each of the respective actuators so as to perform the pump down operation for recovering the refrigerant in the refrigerant circuit RC into the components (e.g., the heat source-side heat exchanger 12 and the receiver 13) in the heat source unit 10. Specifically, the actuator control unit 54 performs the refrigerant recovery control to bring each of the injection valve 16 and the on-off valve 35 into a fully closed state in which each of the injection valve 16 and the on-off valve 35 interrupts a flow of the refrigerant and to operate the compressor 11 at the number of rotations for the pump down operation. The refrigerant in the refrigerant circuit RC is thus recovered into the heat source unit 10. The number of rotations for the pump down operation is set at, but not limited to, the maximum number of rotations in this embodiment.

The actuator control unit 54 completes the refrigerant recovery control upon a lapse of a predetermined time t1 from the start of the refrigerant recovery control (i.e., the pump down operation). The actuator control unit 54 stops the compressor 11 with the on-off valve 35 brought into the closed state, and sets the refrigerant recovery completion flag 513. The predetermined time t1 is calculated in advance in accordance with the configuration and design specifications (e.g., the amount of refrigerant in the refrigerant circuit RC, the number of rotations of the compressor 11) of the refrigerant circuit RC, and is defined in the control program.

The actuator control unit 54 performs leakage refrigerant agitation control (corresponding to "first control" in the appended claims) when a refrigerant leak occurs at the target space SP (specifically, when the inside refrigerant leak flag 515 is set). The actuator control unit 54 performs the leakage refrigerant agitation control to operate the usage-side fan 37 at a predetermined number of rotations in order to prevent local emergence of a combustible region where the refrigerant leaks at a high concentration in the target space SP. In this embodiment, the actuator control unit 54 performs the leakage refrigerant agitation control to operate the usage-side fan 37 at a number of rotations (an airflow volume) for the leakage refrigerant agitation control. The number of rotations for the leakage refrigerant agitation control is set at, but not limited to, the maximum number of rotations (the maximum airflow volume) in this embodiment. The leakage refrigerant agitation control allows, even when a refrigerant leak occurs at the target space SP, an air flow provided by the usage-side fan 37 to agitate the refrigerant leaking in the target space SP, and prevents emergence of a region where the concentration of the leakage refrigerant is high to an extent falling within a combustible range in the target space SP.

(3-5) Drive Signal Output Unit 55

The drive signal output unit 55 outputs drive signals (drive voltages) corresponding to each of the actuators (e.g., 11, 15, 16, 20, 32, 35, 37) in accordance with the details of control by the actuator control unit 54. The drive signal output unit 55 includes a plurality of inverters (not illustrated) that output drive signals to specific components (e.g., the compressor 11, the heat source-side fan 20, the usage-side fan 37) corresponding thereto.

(3-6) Refrigerant Leak Determination Unit 56

The refrigerant leak determination unit 56 performs a refrigerant leak determination process (corresponding to a "refrigerant leak determination" in the appended claims). The refrigerant leak determination process includes: a first determination process to determine whether a refrigerant leak occurs at the refrigerant circuit RC (that is, whether the refrigerant circuit RC is short of the refrigerant) and a second determination process to determine whether a refrigerant leak occurs at the target space SP.

The refrigerant leak determination unit 56 performs the first determination process when the refrigerant leak flag 514 is not set irrespective of whether the refrigeration apparatus 100 is in operation. In this embodiment, the refrigerant leak determination unit 56 performs the first determination process every predetermined time t2. The predetermined time t2 is set in advance in accordance with the configuration and design specifications of the refrigerant circuit RC, and is defined in the control program. The predetermined time t2 is set at, but not limited to, 30 seconds, for example.

The refrigerant leak determination unit 56 performs the first determination process to monitor values detected by the respective sensors and to determine whether a refrigerant leak occurs at the refrigerant circuit RC, based on the states of the detected values. Specifically, the refrigerant leak determination unit 56 performs the first determination process to determine whether a refrigerant leak occurs at the refrigerant circuit RC, based on the state of the refrigerant in the refrigerant circuit RC.

For example, when the suction pressure LP is equal to or less than the predetermined first reference value SV1, the refrigerant leak determination unit 56 determines that a refrigerant leak occurs. When the discharge temperature HT is equal to or more than the predetermined second reference value SV2, the refrigerant leak determination unit 56 also determines that a refrigerant leak occurs. When the liquid level height HL is equal to or less than the predetermined third reference value SV3, the refrigerant leak determination unit 56 also determines that a refrigerant leak occurs.

The refrigerant leak determination unit 56 performs the first determination process to set the refrigerant leak flag 514 when determining that a refrigerant leak occurs at the refrigerant circuit RC. The refrigerant leak determination unit 56 then performs the second determination process when the refrigerant recovery completion flag 513 is set (that is, when the pump down operation is completed). The refrigerant leak determination unit 56 performs the second determination process to refer to values detected by the respective sensors and to determine whether a refrigerant leak occurs at the target space SP, based on the states of the detected values. Specifically, the refrigerant leak determination unit 56 performs the second determination process to determine whether a refrigerant leak occurs at the target space SP, based on the state of the refrigerant in the refrigerant circuit RC. For example, when the suction pressure LP is equal to or less than the predetermined first reference value SV1 after completion of the pump down operation, the refrigerant leak determination unit 56 determines that a refrigerant leak occurs at the target space SP.

The refrigerant leak determination unit 56 performs the second determination process to set the inside refrigerant leak flag 515 when determining that a refrigerant leak occurs at the target space SP.

Each of the first reference value SV1, the second reference value SV2, and the third reference value SV3 for use in the refrigerant leak determination process is calculated in advance in accordance with design specifications and operating conditions (e.g., any or all of the number of rotations of the compressor 11, the number of rotations of the heat source-side fan 20, the number of rotations of the usage-side fan 37, the opening degree of the heat source-side expansion valve 15, the opening degree of the injection valve 16, the opening degree of the usage-side expansion valve 32, the capacity of the heat source-side heat exchanger 12, the capacity of the usage-side heat exchanger 33, the capacity of the receiver 13, and the dimensions of the respective refrigerant pipes). Moreover, each of the first reference value SV1, the second reference value SV2, and the third reference value SV3 is defined in the reference value table stored in the reference value storage region 511. In this embodiment, the first reference value SV1 is particularly a value equivalent to an atmospheric pressure. "The value equivalent to the atmospheric pressure" used herein involves not only a value of the atmospheric pressure, but also a value approximate to the atmospheric pressure. Specifically, "the value equivalent to the atmospheric pressure" includes a value approximate to the atmospheric pressure at a predetermined ratio such as a ratio from 90% or more to 110% or less of the atmospheric pressure. It should be noted that the predetermined ratio (e.g., a numerical range from 90% or more to 110% or less) may be appropriately selected in accordance with design specifications and installation environments.

(3-7) Display Control Unit 57

The display control unit 57 is a functional unit that controls operation of the remote controller 40 serving as the display device. The display control unit 57 causes the remote controller 40 to output predetermined information in order that an operating state or information on a situation is displayed for a user. For example, the display control unit 57 causes the remote controller 40 to display thereon various kinds of information, such as set temperatures, during the cooling operation in the normal mode. When the refrigerant leak flag 514 is set, the display control unit 57 causes the remote controller 40 to display thereon the refrigerant leak notification information.

(4) Processing by Controller 50

Figure 3:
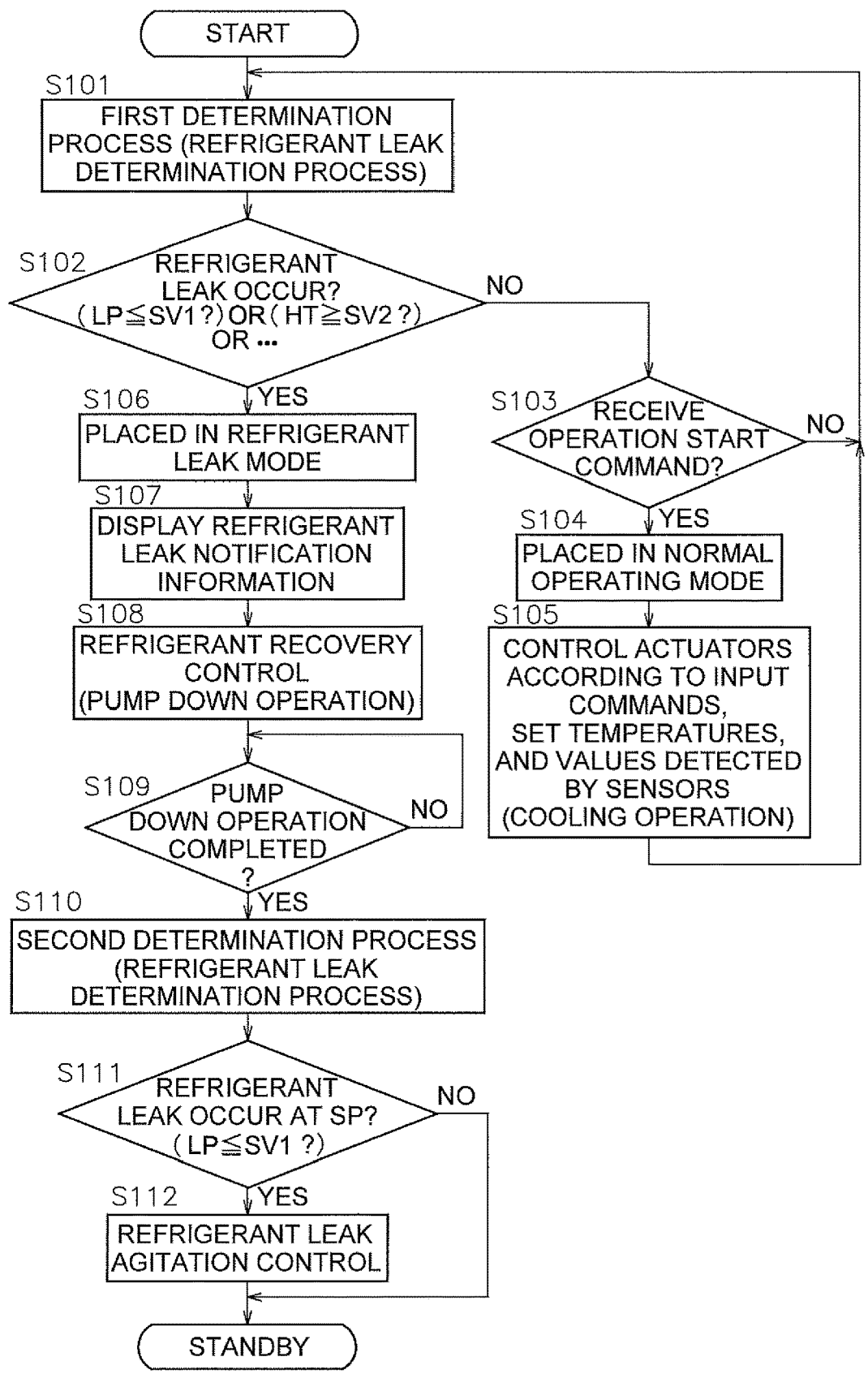
FIG. 3 is a flowchart of exemplary processing to be performed by the controller.

With reference to FIG. 3, next, a description will be given of exemplary processing to be performed by the controller 50. FIG. 3 is a flowchart of the exemplary processing to be performed by the controller 50.

At power-on, the controller 50 sequentially performs steps S101 to S112 illustrated in FIG. 3. In FIG. 3, steps S103 to S105 correspond to processing in a case where the controller 50 is placed in the normal operating mode, and steps S106 to S112 correspond to processing to be performed in the refrigerant leak mode. The processing in FIG. 3 is merely illustrative and may be appropriately changed. For example, the sequence of the steps may be changed, some of the steps may be carried out in parallel, or additional steps may be carried out insofar as there are no consistencies.

In step S101, the controller 50 performs the first determination process of the refrigerant leak determination process every predetermined time t2 in order to determine whether a refrigerant leak occurs at the refrigerant circuit RC. Specifically, the controller 50 performs the first determination process to refer to values detected by the respective sensors and to determine whether a refrigerant leak occurs at the refrigerant circuit RC, based on the states of the detected values (that is, based on the state of the refrigerant in the refrigerant circuit RC). The processing then proceeds to step S102.

In step S102, when the controller 50 determines that no refrigerant leak occurs at the refrigerant circuit RC (NO in S102), the processing proceeds to step S103. When the controller 50 determines that a refrigerant leak occurs at the refrigerant circuit RC (YES in S102; e.g., when the suction pressure LP is equal to or less than the predetermined first reference value SV1, when the discharge temperature HT is equal to or more than the predetermined second reference value SV2, or when the liquid level height HL is equal to or less than the predetermined third reference value SV3), the processing proceeds to step S106.

In step S103, when the controller 50 receives no operation start command (NO in S103), the processing returns to step S101. On the other hand, when the controller 50 receives an operation start command (YES in S103), the processing proceeds to step S104.

In step S104, the controller 50 is placed in the normal operating mode. The processing then proceeds to step S105.

In step S105, the controller 50 controls the states of each of the respective actuators in real time in accordance with the received commands, the set temperatures, and the values detected by the various sensors (20 to 26), thereby causing the refrigeration apparatus 100 to perform the cooling operation. Although not illustrated in the drawings, the controller 50 causes the remote controller 40 to display thereon various kinds of information such as the set temperatures. The processing then returns to step S101.

In step S106, the controller 50 is placed in the refrigerant leak mode. The processing then proceeds to step S107.

In step S107, the controller 50 causes the remote controller 40 to display thereon the refrigerant leak notification information in order to make a notification about occurrence of a refrigerant leak to an administrator and to prompt the administrator to take measures against the refrigerant leak. The processing then proceeds to step S108.

In step S108, the controller 50 performs the refrigerant recovery control to cause the refrigeration apparatus 100 to perform the pump down operation. The controller 50 performs the refrigerant recovery control to control the operations of each of the respective actuators such that the refrigeration apparatus 100 performs the pump down operation to recover the refrigerant in the refrigerant circuit RC into the heat source unit 10. Specifically, the controller 50 performs the refrigerant recovery control to bring each of the injection valve 16 and the on-off valve 35 into the fully closed state and to operate the compressor 11 at the maximum number of rotations. The refrigeration apparatus 100 thus performs the pump down operation. The processing then proceeds to step S109.

In step S109, when the pump down operation is not completed (NO in S109), the controller 50 makes a determination in step S109 again. On the other hand, when the pump down operation is completed (YES in S109), the processing proceeds to step S110.

In step S110, the controller 50 performs the second determination process of the refrigerant leak determination process. The controller 50 performs the second determination process to refer to, for example, the value (i.e., the suction pressure LP) detected by the suction pressure sensor 21 and to determine whether a refrigerant leak occurs at the target space SP, based on whether the suction pressure LP is equal to or less than the first reference value SV1 (that is, based on the state of the refrigerant in the refrigerant circuit RC). The processing then proceeds to step S111.

In step S111, when the controller 50 determines that no refrigerant leak occurs at the target space SP (NO in S111), then the controller 50 is on standby with the refrigerant leak notification information displayed on the remote controller 40 until the administrator cancels the standby state. At this time, each of the heat source-side expansion valve 15, the injection valve 16, the usage-side expansion valve 32, and the on-off valve 35 is brought into the fully closed state to suppress further progression of the refrigerant leak. On the other hand, when the controller 50 determines that a refrigerant leak occurs at the target space SP (YES in S111; e.g., when the suction pressure LP is equal to or less than the first reference value SV1), the processing proceeds to step S112.

In step S112, the controller 50 performs the leakage refrigerant agitation control. Specifically, the controller 50 performs the leakage refrigerant agitation control to operate the usage-side fan 37 at a predetermined number of rotations (the maximum number of rotations in S112) in order to prevent local emergence of a combustible region where the refrigerant leaks at a high concentration in the target space SP. The controller 50 is then on standby, that is, continues to perform the leakage refrigerant agitation control until the administrator cancels the standby state. At this time, each of the heat source-side expansion valve 15, the injection valve 16, the usage-side expansion valve 32, and the on-off valve 35 is brought into the fully closed state to suppress further progression of the refrigerant leak.

(5) Features of Refrigeration Apparatus 100

(5-1)

In this embodiment, the refrigeration apparatus 100 ensures safety while suppressing an increase in cost.

A combustible refrigerant is sometimes employed for a refrigeration apparatus. From the viewpoints of improvement in energy conservation and reduction in environmental load, recently, some refrigeration apparatuses employ a slightly combustible refrigerant (i.e., a refrigerant with low combustibility, which is combustible at a concentration of a predetermined value or more) such as R32. In this regard, such a refrigeration apparatus requires measures for ensuring safety from a refrigerant leak which may occur at a refrigerant circuit due to, for example, damages to or installation failures on pipes and components.

As to a refrigeration apparatus, a usage-side heat exchanger is sometimes disposed in a highly airtight target space having no ventilating opening or the like. As to a refrigeration apparatus to be installed in a container for marine shipping, for example, the space inside the container where a usage-side heat exchanger is disposed is typically a highly airtight space having no ventilating opening. If a refrigerant leak occurs at a usage-side heat exchanger or a refrigerant pipe to be disposed in such a highly airtight target space, the target space may occur local emergence of a region where a slightly combustible refrigerant leaks at a high concentration exceeding a reference value.

In order to avoid such a situation, a refrigerant leak should be detected immediately; however, a refrigerant leak sensor for directly detecting the refrigerant leak results in an increase of manufacturing cost. In addition, such a refrigerant leak sensor may operate abnormally due to a malfunction and age deterioration, and therefore requires regular inspection and maintenance which are costly as to time and effort for the regular inspection and maintenance.

In view of this respect, in the refrigeration apparatus 100, the controller 50 performs the refrigerant leak determination process to determine whether a refrigerant leak occurs, based on the state (e.g., the suction pressure LP, the discharge temperature HT, the liquid level height HL) of the refrigerant in the refrigerant circuit RC. This configuration enables detection of a refrigerant leak without use of a refrigerant leak sensor. This results in a reduction of cost for a refrigerant leak sensor. This configuration therefore suppresses an increase in cost.

The controller 50 performs the leakage refrigerant agitation control upon detection of a refrigerant leak. Upon occurrence of a refrigerant leak, therefore, the usage-side fan 37 operates in the target space SP. As a result, an air flow provided by the usage-side fan 37 agitates the leakage refrigerant in the target space SP, which suppresses local emergence of a combustible region where the refrigerant leaks at a high concentration. This configuration thus ensures safety.

This configuration hence ensures safety while suppressing an increase in cost.

(5-2)

In this embodiment, in the refrigeration apparatus 100, the controller 50 performs the refrigerant leak determination process to determine that a refrigerant leak occurs, when the value (the suction pressure LP) detected by the suction pressure sensor 21 is equal to or less than the predetermined first reference value SV1. The refrigerant leak determination process thus enables a determination as to occurrence of a refrigerant leak based on the pressure (the suction pressure LP) of the low-pressure-side refrigerant in the refrigerant circuit RC. This results in an accurate determination as to occurrence of a refrigerant leak in the refrigerant circuit RC.

(5-3)

In this embodiment, in the refrigeration apparatus 100, the first reference value SV1 is a value equivalent to the atmospheric pressure. The controller 50 thus determines that a refrigerant leak occurs, when the pressure (the suction pressure LP) of the low-pressure-side refrigerant in the refrigerant circuit RC is equal to or less than the atmospheric pressure or has a value approximate to the atmospheric pressure. This results in an accurate determination as to occurrence of a refrigerant leak.

(5-4)

In this embodiment, in the refrigeration apparatus 100, the controller 50 performs the refrigerant leak determination process to determine that a refrigerant leak occurs, when the value detected by the discharge temperature sensor 23 is equal to or more than the predetermined second reference value SV2. The refrigerant leak determination process enables a determination as to occurrence of a refrigerant leak based on the temperature (the discharge temperature HT) of the refrigerant to be discharged from the compressor 11. This results in an accurate determination as to occurrence of a refrigerant leak in the refrigerant leak determination process.

(5-5)

In this embodiment, in the refrigeration apparatus 100, when the controller 50 performs the refrigerant leak determination process (that is, the second determination process) to determine that a refrigerant leak occurs, then the controller 50 performs the refrigerant recovery control to bring the on-off valve 35 into the closed state so as to perform the pump down operation to recover the refrigerant into the component disposed outside the target space SP. The controller 50 stops the compressor 11 after completion of the pump down operation subsequent to the refrigerant recovery control.

With this configuration, upon occurrence of a refrigerant leak, the controller 50 recovers the refrigerant in the refrigerant circuit RC into the component (e.g., the heat source-side heat exchanger 12, the receiver 13) disposed outside the target space SP, and then stops circulation of the refrigerant. This results in suppression of further progression of a refrigerant leak that occurs at the target space SP. With this configuration, the controller 50 also determines whether a refrigerant leak spot is located in the target space SP, based on the state (e.g., the suction pressure LP, the discharge temperature HT, the liquid level height HL) of the refrigerant in the refrigerant circuit RC after completion of the pump down operation.

(5-6)

In this embodiment, in the refrigeration apparatus 100, the controller 50 performs the refrigerant leak determination process to determine whether a refrigerant leak occurs at the target space SP. The controller 50 performs the leakage refrigerant agitation control when determining from the refrigerant leak determination process (the second determination process) that a refrigerant leak occurs at the target space SP.

The controller 50 thus performs the leakage refrigerant agitation control upon occurrence of a refrigerant leak at the target space SP. Specifically, the usage-side fan 37 does not necessarily operate if a refrigerant leak occurs outside the target space SP, but operates only in case of necessity in view of safety (i.e., if a refrigerant leak occurs at the target space SP). This configuration thus improves energy conservation while ensuring safety.

(6) Modifications

The foregoing embodiment may be appropriately modified as described in the following modifications. It should be noted that these modifications are applicable in conjunction with other modifications insofar as there are no consistencies.

(6-1) Modification A

According to the foregoing embodiment, when the controller 50 performs the second determination process of the refrigerant leak determination process to determine that a refrigerant leak occurs at the target space SP, the usage-side fan 37 operates to provide an air flow in the target space SP. However, the refrigeration apparatus 100 is not limited to this configuration. For example, when the controller 50 performs the first determination process of the refrigerant leak determination process to determine that a refrigerant leak occurs at the refrigerant circuit RC, the usage-side fan 37 may operate irrespective of a result of the second determination process. In such a case, the second determination process may be omitted from the refrigerant leak determination process if the second determination process is not necessarily performed. Also in such a case, the refrigerant recovery control (the pump down operation) may be omitted if the refrigerant recovery control is not necessarily performed.

(6-2) Modification B

According to the foregoing embodiment, the controller 50 performs the first determination process of the refrigerant leak determination process to determine occurrence of a refrigerant leak, based on the state of the refrigerant in the refrigerant circuit RC. Specifically, the controller 50 determines that a refrigerant leak occurs at the refrigerant circuit RC, when the value (i.e., the suction pressure LP) detected by the suction pressure sensor 21 is equal to or less than the first reference value SV1, when the value (i.e., the discharge temperature HT) detected by the discharge temperature sensor 23 is equal to or more than the second reference value SV2, or when the value (i.e., the liquid level height HL) detected by the liquid level sensor 26 is equal to or less than the third reference value SV3. However, the controller 50 may make a determination as to occurrence of a refrigerant leak, based on any variable as long as the controller 50 makes a determination as to occurrence of a refrigerant leak, based on a state of the refrigerant in the refrigerant circuit RC.

For example, the controller 50 may determine that a refrigerant leak occurs at the refrigerant circuit RC, when the value (the discharge pressure HP) detected by the discharge pressure sensor 22 is equal to or more than a predetermined reference value. Alternatively, the controller 50 may determine that a refrigerant leak occurs at the refrigerant circuit RC, when the value (the receiver outlet temperature LT) detected by the receiver outlet temperature sensor 24 is equal to or less than a predetermined reference value. Still alternatively, the refrigeration apparatus 100 may include a new sensor not described in the foregoing embodiment, and the controller 50 may determine whether a refrigerant leak occurs at the refrigerant circuit RC, based on a value detected by this sensor.

According to the foregoing embodiment, the controller 50 performs the second determination process of the refrigerant leak determination process to determine that a refrigerant leak occurs at the target space SP, when the value (i.e., the suction pressure LP) detected by the suction pressure sensor 21 after completion of the pump down operation is equal to or less than the first reference value SV1. However, the controller 50 may determine whether a refrigerant leak occurs at the target space SP, based on any variable as long as the controller 50 makes a determination as to occurrence of a refrigerant leak, based on a state of the refrigerant in the refrigerant circuit RC.

For example, the controller 50 may determine that a refrigerant leak occurs at the target space SP, when the value (the discharge temperature HT) detected by the discharge temperature sensor 23 after completion of the pump down operation is equal to or more than the second reference value SV2. Alternatively, the refrigeration apparatus 100 may include a new sensor not described in the foregoing embodiment, and the controller 50 may determine whether a refrigerant leak occurs at the target space SP, based on a value detected by this sensor.

(6-3) Modification C According to the foregoing embodiment, the first reference value SV1 for use in the refrigerant leak determination process is a value equivalent to the atmospheric pressure. However, the first reference value SV1 is not necessarily a value equivalent to the atmospheric pressure, but may be set at any value as long as the controller 50 is capable of determining that a refrigerant leak occurs at the refrigerant circuit RC or the target space SP, based on this value.

(6-4) Modification D

According to the foregoing embodiment, the controller 50 (the refrigerant leak determination unit 56) performs the first determination process of the refrigerant leak determination process every predetermined time t2 (e.g., 30 seconds). However, the time interval for the first determination process by the controller 50 is not limited and may be appropriately changed. For example, the predetermined time t2 is not necessarily limited to 30 seconds, and may be appropriately changed. The predetermined time t2 may be set to be less than 30 seconds (e.g., 10 seconds) or may be set to be equal to or more than 30 seconds (e.g., 1 minute). Alternatively, the controller 50 may perform the first determination process only during operation if there is no particular harm.

(6-5) Modification E

According to the foregoing embodiment, the controller 50 determines the completion of the pump down operation, based on a lapse of the predetermined time t1 after the start of the refrigerant recovery control (the pump down operation), and then performs the various processes (such as the second determination process and the stop of the compressor 11). However, an event as a trigger for determining the completion of the pump down operation is not limited thereto, and may be appropriately changed in accordance with design specifications and installation environments. For example, the controller 50 may determine the completion of the pump down operation, based on the states of the values detected by the sensors (e.g., 21, 22, 23, 24, 26) for detecting the state of the refrigerant in the refrigerant circuit RC.

(6-6) Modification F

According to the foregoing embodiment, in the refrigeration apparatus 100, the heat source unit control unit 27 and the usage unit control unit 39 are connected via the communication line cb1 to constitute the controller 50 for controlling the operation of the refrigeration apparatus 100. However, the configuration of the controller 50 is not limited thereto, and may be appropriately changed in accordance with design specifications and installation environments. In other words, the configuration of the controller 50 is not limited as long as the elements (51 to 57) in the controller 50 are realized.

For example, the controller 50 may be constituted of one of or both the heat source unit control unit 27 and the usage unit control unit 39 as well as the remote controller 40 and other devices such as a centralized control device. Alternatively, the controller 50 may be constituted of the remote controller 40 and other devices such as a centralized control device in place of one of or both the heat source unit control unit 27 and the usage unit control unit 39. In such a case, the other devices may be located at a remote place connected to the heat source unit 10 or the usage unit 30 via a communication network.

(6-7) Modification G

According to the foregoing embodiment, the controller 50 causes the remote controller 40 to output the refrigerant leak notification information. In this regard, the controller 50 may cause any unit to output the refrigerant leak notification information, in addition to the remote controller 40. For example, the controller 50 may cause a loudspeaker capable of audio output to output a predetermined audible alarm or a predetermined voice message. Alternatively, the controller 50 may cause a light source such as a light emitting diode (LED) lamp to blink or light up, thereby outputting the refrigerant leak notification information. Still alternatively, the controller 50 may cause a unit capable of outputting the refrigerant leak notification information to output the refrigerant leak notification information in a facility in which the refrigeration apparatus 100 is installed or in a device such as a centralized control device located at a remote place away from the site. If an administrator is able to grasp a refrigerant leak without the refrigerant leak notification information, the refrigerant leak notification information is not necessarily output and may be appropriately omitted.

(6-8) Modification H

According to the foregoing embodiment, R32 is employed as a refrigerant that circulates through the refrigerant circuit RC. However, the refrigerant for use in the refrigerant circuit RC is not limited, and other refrigerants may be employed. For example, HFO1234yf, HFO1234ze (E), and a mixture thereof may be employed in place of R32 for the refrigerant circuit RC. Alternatively, a hydrofluorocarbon (HFC) refrigerant such as R407C or R410A may be employed for the refrigerant circuit RC. Also in such cases, upon occurrence of a refrigerant leak at the refrigerant circuit RC, the usage-side fan 37 operates in the target space SP to provide an air flow agitating the leakage refrigerant, which suppresses a local increase in concentration of the leakage refrigerant.

(6-9) Modification I

According to the foregoing embodiment, the present invention is applied to a refrigeration apparatus 100 configured to cool a target space SP such as the interior of a low-temperature warehouse, the interior of a shipping container, or the interior of a showcase in a store. However, the present invention is not limited thereto and is applicable to any refrigeration apparatus including a refrigerant circuit. For example, the present invention is applicable to an air conditioning system (an air conditioner) that achieves air conditioning by cooling the interior of a building. For example, the present invention is also applicable to a refrigeration apparatus configured to heat or warm a space where a usage unit 30 is placed, using a usage-side heat exchanger 33 functioning as a condenser (or a radiator for a refrigerant), by rearrangement of a four-way switching valve or a refrigerant pipe in the refrigerant circuit RC illustrated in FIG. 1.

(6-10) Modification J

According to the foregoing embodiment, the refrigeration apparatus 100 includes one heat source unit 10 and one usage unit 30. However, the number of heat source units 10 and/or the number of usage units 30 are/is not limited to one. For example, the refrigeration apparatus 100 may include one or more heat source units 10 and one or more usage units 30. For example, the refrigeration apparatus 100 may include a plurality of heat source units 10 connected to one usage unit 30 in series or in parallel. Alternatively, the refrigeration apparatus 100 may include a plurality of usage units 30 connected to one heat source unit 10 in series or in parallel.

According to the foregoing embodiment, the refrigerant circuit RC includes one compressor 11. However, the number of compressors 11 is not limited to one. For example, the refrigerant circuit RC may include one or more compressors 11.

In the foregoing embodiment, the configuration of the refrigerant circuit RC may be appropriately changed in accordance with installation environments and design specifications. In the refrigerant circuit RC, specifically, some of the circuit elements may be replaced with other components or may be appropriately omitted if the refrigerant circuit RC does not necessarily include such circuit elements.

For example, the usage-side expansion valve 32 is an electric valve. Alternatively, the usage-side expansion valve 32 may be a thermostatic expansion valve that operates in accordance with a change in temperature of a feeler tube or may be replaced with a capillary tube. For example, the receiver 13, the subcooler 14, the injection valve 16, the check valve 19, or the injection pipe P4 may be appropriately omitted if the heat source unit 10 does not necessarily include the receiver 13, the subcooler 14, the injection valve 16, the check valve 19, or the injection pipe P4. For example, the heating pipe 31 and the drain pan 34 may be appropriately omitted if the usage unit 30 does not necessarily include the heating pipe 31 and the drain pan 34.

For example, the gas-side connection pipe G1 or the liquid-side connection pipe L1 may be appropriately omitted if the refrigeration apparatus 100 does not necessarily include the gas-side connection pipe G1 or the liquid-side connection pipe L1. In such a case, the liquid-side refrigerant pipe P2 may be connected to the first liquid-side refrigerant pipe P5 with a coupling, a valve, or the like, or the second gas-side refrigerant pipe P3 may be connected to the gas-side refrigerant pipe P7 with a coupling, a valve, or the like. In such a case, the liquid-side shutoff valve 17 or the gas-side shutoff valve 18 may be appropriately omitted if the refrigeration apparatus 100 does not necessarily include the liquid-side shutoff valve 17 or the gas-side shutoff valve 18.

In addition, the refrigerant circuit RC may include a new constituent element. For example, the heat source unit 10 may additionally include an accumulator configured to temporarily store the liquid refrigerant flowing through the second gas-side refrigerant pipe P3, thereby suppressing an inflow of the liquid refrigerant into the compressor 11, and an oil separator configured to return a refrigerating machine oil to the compressor 11. The refrigerant circuit RC may also include a refrigerant pipe constituting a refrigerant flow path not illustrated in FIG. 1.

(6-11) Modification K

According to the foregoing embodiment, the remote controller 40 is connected to the usage unit control unit 39 via the communication line cb2. Alternatively, the remote controller 40 may be connected to the heat source unit control unit 27 via the communication line cb1. Still alternatively, the remote controller 40 may be appropriately omitted if the refrigeration apparatus 100 does not necessarily include the remote controller 40.

INDUSTRIAL APPLICABILITY

The present invention is applicable to a refrigeration apparatus including a refrigerant circuit.

REFERENCE SIGNS LIST

10: heat source unit
11: compressor (actuator)
12: heat source-side heat exchanger
13: receiver
14: subcooler
15: heat source-side expansion valve (actuator)
16: injection valve (actuator)
17: liquid-side shutoff valve
18: gas-side shutoff valve
19: check valve
20: heat source-side fan (actuator)
21: suction pressure sensor (pressure sensor)
22: discharge pressure sensor
23: discharge temperature sensor (temperature sensor)
24: receiver outlet temperature sensor
25: outside temperature sensor
26: liquid level sensor
27: heat source unit control unit
30: usage unit
31: heating pipe
32: usage-side expansion valve (actuator)
33: usage-side heat exchanger
34: drain pan
35: on-off valve (interruption valve, actuator)
36: check valve
37: usage-side fan (fan, actuator)
38: inside temperature sensor
39: usage unit control unit
40: remote controller
50: controller
100: refrigeration apparatus
G1: gas-side connection pipe
HT: discharge temperature
L1: liquid-side connection pipe
LP: suction pressure
P1: first gas-side refrigerant pipe
P2: liquid-side refrigerant pipe
P3: second gas-side refrigerant pipe
P4: injection pipe
P5: first liquid-side refrigerant pipe
P6: second liquid-side refrigerant pipe
P7: gas-side refrigerant pipe
RC: refrigerant circuit
SP: target space
SV1: first reference value
SV2: second reference value
SV3: third reference value

CITATION LIST

Patent Literature

Patent Literature 1: JP 2005-274065 A

The invention claimed is:

1. A refrigeration apparatus for a refrigeration cycle in a refrigerant circuit including a compressor configured to compress a refrigerant, a heat source-side heat exchanger, and a usage-side heat exchanger disposed in a target space to be cooled or heated, the refrigeration apparatus comprising:

a fan disposed in the target space and configured to provide an air flow;

an interruption valve to be switched to a closed state to interrupt a flow of the refrigerant from an outside of the target space into an inside of the target space; and a controller configured to control operation of each of a plurality of actuators, the controller being configured to make a first and a second refrigerant leak determinations as to whether a refrigerant leak occurs, based on a state of the refrigerant in the refrigerant circuit, when the controller makes the first refrigerant leak determination to determine that a refrigerant leak occurs, then the controller performs first control to bring the interruption valve into the closed state so as to perform a pump down operation to recover the refrigerant into a component disposed outside the target space, and stops the compressor after completion of the pump down operation subsequent to the first control, then, the controller makes the second refrigerant leak determination to determine whether a refrigerant leak occurs at the target space, and when the controller makes the second refrigerant leak determination to determine that a refrigerant leak occurs at the target space, then the controller performs the second control.

2. The refrigeration apparatus according to claim 1, further comprising:

a pressure sensor configured to detect a pressure of low-pressure refrigerant in the refrigerant circuit, wherein the controller makes the first or second refrigerant leak determination to determine that a refrigerant leak occurs, when a value detected by the pressure sensor is equal to or less than a predetermined first reference value.

3. The refrigeration apparatus according to claim 2, wherein the first reference value is a value equivalent to an atmospheric pressure.

4. The refrigeration apparatus according to claim 1, further comprising:

a temperature sensor configured to detect a temperature of the refrigerant to be discharged from the compressor, wherein the controller makes the first or second refrigerant leak determination to determine that a refrigerant leak occurs, when a value detected by the temperature sensor is equal to or more than a predetermined second reference value.

5. The refrigeration apparatus according to claim 2, further comprising:

a temperature sensor configured to detect a temperature of the refrigerant to be discharged from the compressor, wherein the controller makes the first or second refrigerant leak determination to determine that a refrigerant leak occurs, when a value detected by the temperature sensor is equal to or more than a predetermined second reference value.

6. The refrigeration apparatus according to claim 3, further comprising:

a temperature sensor configured to detect a temperature of the refrigerant to be discharged from the compressor, wherein the controller makes the first or second refrigerant leak determination to determine that a refrigerant leak occurs, when a value detected by the temperature sensor is equal to or more than a predetermined second reference value.

* * * * *